(12) United States Patent
Giron et al.

(10) Patent No.: US 9,272,941 B2
(45) Date of Patent: Mar. 1, 2016

(54) METHOD OF CUTTING A PANEL USING A STARTER CRACK AND A GLASS PANEL INCLUDING A STARTER CRACK

(71) Applicant: SAGE Electrochromics, Inc., Faribault, MN (US)

(72) Inventors: Jean-Christophe Giron, Edina, MN (US); Harvey Kalweit, Faribault, MN (US); Michael A. McCoy, Eden Prairie, MN (US); Li-Ya Yeh, Geilenkirchen (DE); Jean-Pierre Douche, Le Plessis Brion (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 13/790,126

(22) Filed: Mar. 8, 2013

(65) Prior Publication Data

US 2013/0266757 A1  Oct. 10, 2013

Related U.S. Application Data

(60) Provisional application No. 61/620,713, filed on Apr. 5, 2012.

(51) Int. Cl.
*B23K 26/00* (2014.01)
*C03B 33/02* (2006.01)
(Continued)

(52) U.S. Cl.
CPC ......... *C03B 33/0222* (2013.01); *B23K 26/4075* (2013.01); *B28D 5/0011* (2013.01); *C03B 33/027* (2013.01); *C03B 33/091* (2013.01); *C03B 33/105* (2013.01); *Y10T 428/24* (2015.01)

(58) Field of Classification Search
CPC   C03B 33/0222; C03B 33/027; C03B 33/091; C03B 33/105; B23K 26/4075
USPC ............. 219/121.67–121.69, 121.72, 121.61; 428/76, 141, 189, 220, 332, 426, 436
See application file for complete search history.

(56) References Cited

U.S. PATENT DOCUMENTS 3,865,294 A   2/1975   Ernsberger et al.
4,419,386 A   12/1983  Gordon
(Continued)

FOREIGN PATENT DOCUMENTS

CN      1510494 A        7/2004
DE   102006042538 A1     3/2008
(Continued)

OTHER PUBLICATIONS

International Search Report for Application No. PCT/US2013/029871 dated Jun. 26, 2013.
(Continued)

*Primary Examiner* — Thien S Tran
(74) *Attorney, Agent, or Firm* — Abel Law Group, LLP; Robert N Young

(57) ABSTRACT

The disclosure is directed to a cutting process involving: (a) creating a starter crack using a scribe wheel, (b) application of laser or electrothermal heating, and (c) subsequent cooling from a gas or an aerosol jet, as the laser beam and cooling jet move along the desired cutting line. The cutting process can be implemented for cutting a glass panel or other substrate into a plurality of smaller panels. The starter crack may be created on any of the smaller panels within about 10 mm to about 20 mm from the corner of the smaller panel.

20 Claims, 9 Drawing Sheets

(51) Int. Cl.
- *B28D 5/00* (2006.01)
- *B23K 26/40* (2014.01)
- *C03B 33/09* (2006.01)
- *C03B 33/10* (2006.01)
- *C03B 33/027* (2006.01)

(56) References Cited

U.S. PATENT DOCUMENTS

| | | | |
|---|---|---|---|
| 4,844,591 | A | 7/1989 | Arribart et al. |
| 5,124,832 | A | 6/1992 | Greenberg et al. |
| 5,154,334 | A * | 10/1992 | Dekker et al. ............... 225/2 |
| 5,229,040 | A | 7/1993 | Desbat et al. |
| 5,239,406 | A | 8/1993 | Lynam |
| 5,244,557 | A | 9/1993 | Defendini et al. |
| 5,248,545 | A | 9/1993 | Proscia |
| 5,283,310 | A | 2/1994 | Armand et al. |
| 5,321,544 | A | 6/1994 | Parkhe et al. |
| 5,370,775 | A | 12/1994 | Parkhe |
| 5,404,244 | A | 4/1995 | Van Dine et al. |
| 5,501,919 | A | 3/1996 | Paul et al. |
| 5,507,965 | A | 4/1996 | Padoy et al. |
| 5,530,581 | A | 6/1996 | Cogan |
| 5,657,149 | A | 8/1997 | Buffat et al. |
| 5,659,417 | A | 8/1997 | Van Dine et al. |
| 5,668,663 | A | 9/1997 | Varaprasad et al. |
| 5,724,175 | A | 3/1998 | Hichwa et al. |
| 5,724,177 | A | 3/1998 | Ellis, Jr. et al. |
| 5,755,537 | A | 5/1998 | Lubbering |
| 5,757,537 | A | 5/1998 | Ellis, Jr. et al. |
| 5,825,526 | A | 10/1998 | Bommarito et al. |
| 5,889,608 | A | 3/1999 | Buffat et al. |
| 5,985,486 | A | 11/1999 | Giron |
| 6,055,088 | A | 4/2000 | Fix et al. |
| 6,154,306 | A | 11/2000 | Varaprasad et al. |
| 6,186,384 | B1 * | 2/2001 | Sawada ............... 225/2 |
| 6,195,193 | B1 | 2/2001 | Anderson et al. |
| 6,204,953 | B1 | 3/2001 | Zieba et al. |
| 6,252,197 | B1 * | 6/2001 | Hoekstra et al. ......... 219/121.84 |
| 6,256,152 | B1 | 7/2001 | Coldrey et al. |
| 6,259,549 | B1 | 7/2001 | Leupolz et al. |
| 6,355,125 | B1 | 3/2002 | Tahon et al. |
| 6,407,360 | B1 * | 6/2002 | Choo et al. ............... 219/121.67 |
| 6,502,423 | B1 | 1/2003 | Ostendarp et al. |
| 6,587,250 | B2 | 7/2003 | Armgarth et al. |
| 6,639,708 | B2 | 10/2003 | Elkadi et al. |
| 6,785,036 | B1 | 8/2004 | Berneth et al. |
| 7,033,655 | B2 | 4/2006 | Beteille et al. |
| 7,074,486 | B2 | 7/2006 | Boire et al. |
| 7,110,157 | B2 | 9/2006 | Beteille et al. |
| 7,230,748 | B2 | 6/2007 | Giron et al. |
| 7,245,414 | B2 | 7/2007 | Liang et al. |
| 7,273,403 | B2 | 9/2007 | Yokota et al. |
| 7,372,610 | B2 | 5/2008 | Burdis et al. |
| 7,593,154 | B2 | 9/2009 | Burdis et al. |
| 7,710,671 | B1 | 5/2010 | Kwak et al. |
| 7,738,155 | B2 | 6/2010 | Agrawal et al. |
| 7,835,059 | B2 | 11/2010 | Giri et al. |
| 7,855,821 | B2 | 12/2010 | Baumann et al. |
| 7,884,994 | B2 | 2/2011 | Piroux |
| 8,102,585 | B2 | 1/2012 | Giron et al. |
| 8,218,224 | B2 | 7/2012 | Kwak et al. |
| 8,482,837 | B2 | 7/2013 | Sbar et al. |
| 8,482,838 | B2 | 7/2013 | Sbar et al. |
| 8,506,096 | B2 | 8/2013 | McCabe et al. |
| 2002/0054419 | A1 | 5/2002 | Beteille et al. |
| 2002/0118437 | A1 | 8/2002 | Rukavina et al. |
| 2002/0126365 | A1 | 9/2002 | Armgarth et al. |
| 2003/0209528 | A1 | 11/2003 | Choo et al. |
| 2003/0227663 | A1 | 12/2003 | Agrawal et al. |
| 2004/0067343 | A1 | 4/2004 | Beteille et al. |
| 2004/0086688 | A1 | 5/2004 | Hirano et al. |
| 2005/0002081 | A1 | 1/2005 | Beteille et al. |
| 2006/0065647 | A1 | 3/2006 | Kim et al. |
| 2006/0101858 | A1 * | 5/2006 | Fujii ............... 65/29.18 |
| 2006/0191970 | A1 | 8/2006 | Kataoka et al. |
| 2007/0002422 | A1 | 1/2007 | O'Shaughnessy |
| 2007/0090100 | A1 | 4/2007 | Yonai et al. |
| 2007/0151962 | A1 | 7/2007 | Doll et al. |
| 2009/0027759 | A1 | 1/2009 | Albahri |
| 2009/0194514 | A1 | 8/2009 | Yue |
| 2009/0262411 | A1 | 10/2009 | Karmhag et al. |
| 2009/0297806 | A1 | 12/2009 | Dawson-Elli et al. |
| 2010/0078417 | A1 | 4/2010 | Abramov et al. |
| 2010/0134865 | A1 | 6/2010 | Higuchi et al. |
| 2010/0208326 | A1 | 8/2010 | Kwak et al. |
| 2010/0210442 | A1 * | 8/2010 | Abramov et al. ............... 501/66 |
| 2010/0279067 | A1 | 11/2010 | Sabia et al. |
| 2011/0049765 | A1 * | 3/2011 | Li et al. ............... 264/400 |
| 2011/0261429 | A1 | 10/2011 | Sbar et al. |
| 2011/0267672 | A1 | 11/2011 | Sbar et al. |
| 2011/0297806 | A1 | 12/2011 | Park et al. |
| 2011/0304899 | A1 | 12/2011 | Kwak et al. |
| 2012/0047956 | A1 * | 3/2012 | Li ............... 65/112 |
| 2013/0258437 | A1 | 10/2013 | Sbar et al. |
| 2013/0258438 | A1 | 10/2013 | Sbar et al. |
| 2013/0266757 | A1 * | 10/2013 | Giron et al. ............... 428/98 |
| 2013/0312341 | A1 | 11/2013 | Gy et al. |
| 2014/0370257 | A1 | 12/2014 | Dawson-Elli et al. |

FOREIGN PATENT DOCUMENTS

| | | |
|---|---|---|
| EP | 0253713 A1 | 1/1988 |
| EP | 0382623 A1 | 8/1990 |
| EP | 408427 A1 | 1/1991 |
| EP | 0518754 A1 | 12/1992 |
| EP | 0521602 A1 | 1/1993 |
| EP | 0532408 A1 | 3/1993 |
| EP | 0575207 A1 | 12/1993 |
| EP | 0612826 A1 | 8/1994 |
| EP | 0670346 A1 | 9/1995 |
| EP | 0825478 A1 | 2/1998 |
| EP | 0831360 A1 | 3/1998 |
| EP | 1253461 A2 | 10/2002 |
| EP | 1434083 A2 | 6/2004 |
| FR | 2781062 A1 | 1/2000 |
| FR | 2829723 A1 | 3/2003 |
| JP | 57-158623 A | 9/1982 |
| JP | 59-195629 A | 11/1984 |
| JP | 07-318877 | 12/1995 |
| JP | 2000290031 A | 10/2000 |
| JP | 2002289899 A | 10/2002 |
| JP | 2003197103 A | 7/2003 |
| JP | 2009023215 A | 2/2009 |
| JP | 2010108684 A | 5/2010 |
| JP | 2011524269 A | 9/2011 |
| JP | 2012511498 A | 5/2012 |
| WO | 0003290 A1 | 1/2000 |
| WO | 02-06889 A1 | 1/2002 |
| WO | 02-07967 A1 | 1/2002 |
| WO | 03098339 A2 | 11/2003 |
| WO | 2005007398 A2 | 1/2005 |
| WO | 2010068525 A2 | 6/2010 |
| WO | 2010126977 A1 | 11/2010 |
| WO | 2011028254 A2 | 3/2011 |
| WO | 2011109688 A1 | 9/2011 |

OTHER PUBLICATIONS

Chinese Office Action for Application No. 201180044447.3, dated Jul. 2, 2014, 19 pages.
Wei, Hongli et al., "New Progress of Study on Inorganic Electrochromic Glass," Glass, No. 1, Feb. 28, 2006, pp. 34-37 (English Summary Provided).
International Search Report and Written Opinion for Application No. PCT/EP2011/061408, dated Oct. 10, 2011, 11 pages.
International Search Report and Written Opinion for Application No. PCT/EP2011/061407, dated Sep. 27, 2011, 11 pages.
International Search Report and Written Opinion for Application No. PCT/EP2011/060363, dated Sep. 22, 2011, 9 pages.
Notice of Allowance for U.S. Appl. No. 13/040,787, dated Jun. 3, 2013, 9 pages.
Notice of Allowance for U.S. Appl. No. 13/178,065, dated May 31, 2013, 9 pages.

(56) References Cited

OTHER PUBLICATIONS

Notice of Allowance for U.S. Appl. No. 13/906,456, dated Jan. 14, 2015, 18 pages.
Notice of Allowance for U.S. Appl. No. 13/906,487, dated Apr. 17, 2015, 17 pages.
Beason, W. Lynn et al., "A Thermal Stress Evaluation Procedure for Monolithic Annealed Glass," Symp on the Use of Glass in Buildings, ASTM STP 1434, V. Block Ed., dated 2002, pp. 105-118.
Veer F.A. et al., "The Strength of Annealed, Heat-Strengthened and Fully Tempered Float Glass," Fatigue & Fracture of Engineering Materials & Structures, vol. 32, dated 2009, pp. 18-25.
Chinese Office Action for Application No. CN 201180013326.2 (with translation), dated Mar. 31, 2014, 25 pages.
Zhimalov, A.B. et al., "Science for glass production—laser cutting of float glass during production", published in Glass & Ceramics, vol. 63, Nos. 9-10, dated 2006, pp. 319-321.
Kondratenko, V.S. et al, "Laser strengthening of the edge of glass", published in J. Opt. Technol. 76 (II), Nov. 2009, pp. 733-736.
Abramov, Anatoli A. et al., "Laser separation of chemically strengthened glass", published in Physics Procedia 5, dated 2010, pp. 285-290.
Shitova, L.A. et al., "Quality requires constant attention—Glass edge quality and strength", published in Steklo i Keramika, Plenum Publishing Corporation, No. 8, Aug. 1991, pp. 327-329.
Presentation "JENOPTIK—VOTAN Salas Series for the Photovoltaic Market", held on Dec. 29, 2009, in particularly slides 35-38.
Kurkjian, Charles R., "Strength of Inorganic Glass", proceedings of a NATO Advanced Research Workshop entitled Strength of Glass, held on Mar. 21-25, dated 1983, published in 1985, 11 pages.
Degel, Michael, Jenoptik Automatisierungstechnik GmbH, "Latest state-of-the-art laser cutting development", published in the proceedings of "Glass Performance Days" in Tampere, Finland, Jun. 15-18, 2007, 3 pages.
European Office Action for Application No. 13173248.9 dated Apr. 17, 2014, 7 pages.
Japanese Office Action for Application No. 2012-556257 dated Jul. 24, 2014, 4 pages.
International Search Report and Written Opinion, PCT/US11/27148, dated Jun. 7, 2011, 12 pages.
Extended European Search Report for Application No. EP13173248 dated Jul. 25, 2013, 10 pages.
Non-Final Office Action for U.S. Appl. No. 13/040,787, dated Mar. 14, 2012, 27 pages.
Non-Final Office Action for U.S. Appl. No. 13/040,787, dated Oct. 10, 2012, 44 pages.
Non-Final Office Action for U.S. Appl. No. 13/178,065, dated Mar. 14, 2012, 14 pages.
Non-Final Office Action for U.S. Appl. No. 13/178,065, dated Oct. 15, 2012, 34 pages.
Non-Final Office Action for U.S. Appl. No. 13/906,456, dated May 22, 2014, 34 pages.
Non-Final Office Action for U.S. Appl. No. 13/906,487, dated May 22, 2014, 42 pages.
Final Office Action for U.S. Appl. No. 13/906,487, dated Dec. 18, 2014, 18 pages.
Vuolio, Aki, "Structural Behaviour of Glass Structures in Facades," Helsinki University of Technology Laboratory of Steel Structures Publications 27, Thesis for the Degree of Licentiate of Science in Technology, dated 2003, 163 pages.

* cited by examiner

FIG. 6
WIND LOAD 5,400 Pa AT 25 °C
EC: 3.2 mm GLASS; 0.76 mm PVB; 2.2 mm GLASS; 12 mm ARGON; 6 mm GLASS
SPACE HOLDER FROM ALUMINUM WALL THICKNESS 0.15 mm
RESULTS: TENSILE STRESS IN Pa IN EC GLASS: ON SIDE 4 AT CORNER
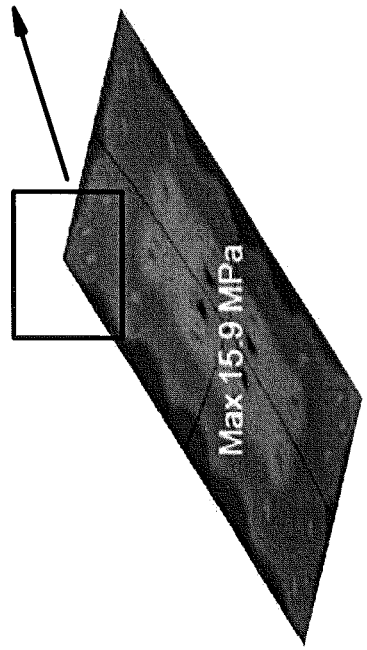
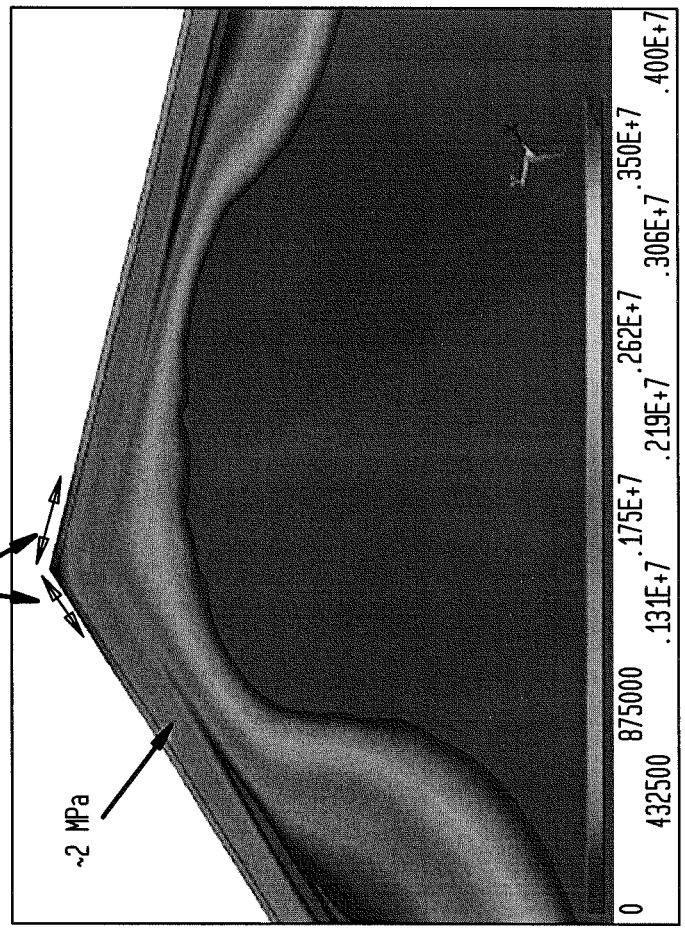

METHOD OF CUTTING A PANEL USING A STARTER CRACK AND A GLASS PANEL INCLUDING A STARTER CRACK

CROSS-REFERENCE TO RELATED APPLICATIONS

The present application claims the benefit of the filing date of U.S. Provisional Patent Application No. 61/620,713 filed Apr. 5, 2012, the disclosure of which is hereby incorporated herein by reference.

FIELD OF THE INVENTION

This invention maximizes the use of a cutting process, such as a laser cutting process, to separate daughter panels on a large EC panel by allowing the cut daughter panel to include the region associated with a starter crack.

BACKGROUND OF THE INVENTION

Electrochromic devices prepared as laminates are known in the art. By way of example only, a laser cutting process may be used to prepare electrochromic (EC) panels on 2.2 mm annealed float glass from a large master panel that will be laminated onto a heat-strengthened or tempered outer lite. A process for manufacturing an electrochromic device laminate is described in PCT application PCT/US2011/027148, the disclosure of which is hereby incorporated by reference herein in its entirety.

It is believed that the use of annealed float glass for an EC application requires a careful treatment of the EC panel edge preparation in order to provide a strong enough edge to withstand in-service thermal stresses which are created by solar heating of the center of the panel. The analysis of stress generation and the increased protection afforded by use of laser cutting compared to conventional preparation methods are described in co-pending applications U.S. application Ser. Nos. 13/178,065 and 13/040,787, the disclosures of which are hereby incorporated by reference herein in their entirety.

Conventionally, in order to prepare an EC panel having a sufficiently strong edge to withstand in-service thermal stresses, laser cutting of the EC panel must begin outside of the finished panel. This is because the portion of the panel at which the laser cutting begins would be subject to possibly weakened stress resistance levels. FIG. 1 shows an example layout for cutting custom sized EC panels from a master panel 10. In FIG. 1, the master panel 10 is prepared to be cut into daughter panels 12, 14, 16, and 18. In order to cut apart panels 14 and 16, a laser cut must be performed along line 15. In order to perform such a laser cut, the laser cut should not begin in the area reserved for any of panels 12, 14, 16 or 18. Therefore, waste areas 11 and 19, on the border and in the middle of the master panel 10, must be reserved for beginning the laser cuts.

In the example of FIG. 1, the starter crack, or starter cut, for line 15 is approximately 15 mm from the intersection among panels 14 and 16 and waste area 19, and approximately 15 mm from the border between panel 12 and waste area 19. Thus, the waste area 19 is a 'no-use' region in the middle of the master panel 10, approximately about 20-25 mm in width. This would result in both a loss of useable area on the master panel as well as limit the customizability in daughter panel placement, and further reduces pattern yields.

BRIEF SUMMARY OF THE INVENTION

The disclosure provides for a method of laser scribing electrochromic panels such that reduces the amount of waste area or no-use regions in the preparation process, as compared to the above described conventional method.

BRIEF DESCRIPTION OF THE DRAWINGS

FIG. 6 is FE experimental data of an EC panel in accordance with an aspect of the disclosure.

DETAILED DESCRIPTION

Figure 8:
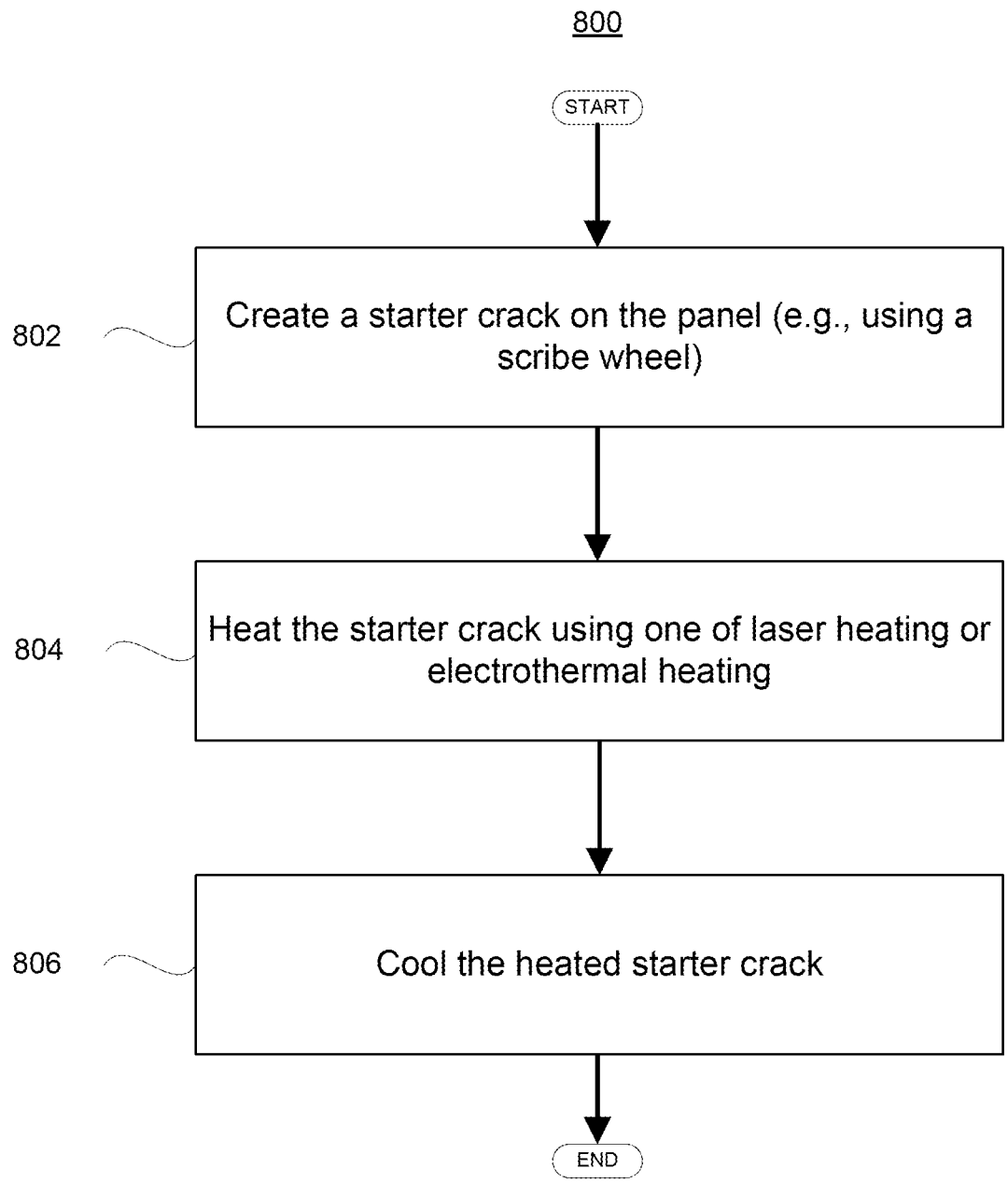
FIG. 8 is a flow diagram of a method in accordance with an aspect of the disclosure.

As depicted in FIG. 8, the cutting process 800 of the present disclosure includes: (802) creating a starter crack using a scribe wheel, (804) application of laser heating, and (806) subsequent cooling from a gas or an aerosol jet, as the laser beam and cooling jet move along the desired cutting line. This process may be applied to a pane of glass, a laminate, or other substrate.

In some examples, the cutting process may involve electrothermal cutting in place of laser heating/scribing. Similarly, although the description presented herein describes an example cutting process involving a laser beam performing laser cutting, the laser beam may be replaced in those examples with an electrothermal cutting implement that focuses heat on a select portion of the substrate (i.e., in order to cut the substrate). The electrothermal cutting may then be followed with cooling from a gas or aerosol jet, as done in laser cutting methods, in the same manner as described below.

The cutting process begins by creating a starter crack. The starter crack may be created by any implement capable of at least partially cutting the glass such that the glass may be further cut by way of thermal stresses or thermal gradients to the glass. For example, the starter crack may be created by a scribe wheel. If a scribe wheel is used, the scribe wheel may be a typical glass cutting wheel, commonly used for mechanically separating panels of glass. For further example, other types of glass scribing tools, such as a sharpened diamond or carbide point, could potentially be used. The scribe wheel or other tool could be rotating or fixed, depending on the nature of the cut to be made (e.g., relatively straight cut, curved cut, etc.).

An amount of force is applied to the glass using the scribe wheel, and that force causes the glass to crack at the location at the starter crack location. The force is selected to be strong enough to crack the glass yet not too strong such that portions of the glass not contacted by the scribe wheel are also cut. The scribe wheel may be applied to the substrate with a force of 10 Newton or less, preferably 8 Newton or less. This force generally creates a starter crack between about 5 mm and about 6 mm long, and between about 300 to about 1200 microns deep. Preferably the depth of the starter crack should be kept to a maximum of about 500 microns.

While creating starter cracks is important in the laser cutting techniques described herein, it is also important for other glass cutting technologies, including laser 'through-cut' technologies such as multiple laser beam absorption (MLBA) and arc discharge. Accordingly, the technology described in this disclosure is similarly beneficial for other starter crack applications beyond use in the discussed laser cutting techniques.

After forming the starter crack, the glass is scribed using a laser heating process (or alternatively, as referenced above, an electrothermal cutting process). Scribing begins from the location of the starter crack and continues in a continuous line, either until the edge of the glass or until the desired end of the laser cut. The continuous cutting line may be relatively straight or may be curved (e.g., curved cutting line 49 in FIG. 3B).

Laser heating may be performed using a continuous wave (CW) $CO_2$ laser. The CW alser may be operated at a typical wavelength of about 10,600 nanometers (nm), is strongly absorbed by silicate glasses, and is the preferred laser type. Other nearby $CO_2$ wavelengths could also be used. Of course, other wavelengths could be used, as long as the output is of a wavelength that is very much absorbed by the glass while effectuating a cut. It is believed that special glass compositions could accommodate specific alternate wavelengths, to achieve the required high absorption. In some examples, a pulsed laser may be used, provided that there is sufficient pulse overlap to provide for an effectively continuous, or "quasi-CW", beam. In many of these examples, the light emitted from the lasers is believed to be strongly, or very much, absorbed in the glass.

The beam power level should be matched to the area of the beam on the glass. For example, the beam power level for a relatively long beam, which may allow faster straight line motion, should be relatively higher. In some examples, a power density of about 1 to 2 $W/mm^2$ is sufficient, but higher or lower densities may be used, given adherence to the limits described herein. For further illustration of the above described considerations, the Jenoptik system utilizes a beam having an ellipse of about 110 mm in length and 2 mm in width, and the laser power of that beam is about 300 W at a wavelength of 10,600 nm.

The intensity of the laser beam focused on the glass is limited to values high enough to heat the area of the glass on which the beam is focused (e.g., to cause thermal stress cracking) yet low enough so as not to ablate material. Likewise, the temperature for the laser heating should be high enough to cause thermal stress cracking without being too high to cause softening to the glass surface or in the local vicinity of the surface.

The speed at which the laser beam (or, alternatively, electrothermal cutter, as referenced above) propagates the crack is further limited by the rate at which the laser beam can heat the glass. The laser beam may be propagated between about 50 millimeters per second and about 1000 millimeters per second. Preferably, the laser beam is propagated at about 200 miliimeters per second. In order to increase the crack propagation rate, the focused area of the laser beam can be elongated in the direction of motion, allowing the laser beam to focus on each individual spot of the glass for longer time, thus providing a longer heating time for each respective spot at a higher motion rate. (See, e.g., FIG. 3B, focus area 50a.) Such a motion rate should be selected such that it does not exceed the surface ablation damage threshold.

In those examples in which the crack follows a curved path (even in three dimensions, such as along a concave or convex surface), the long axis of the elongated beam must be oriented to be approximately tangent to the desired cutting path. There is a relationship between the path radius and the beam length, with shorter radii requiring shorter beam lengths. For example, a shorter beam length (represented by focus area 50b) may be used for cutting along curved line 49 than the beam length used for cutting along a straight line (such as the beam length represented by focus area 50a). Thus, the curved path will require lower motion rates to achieve the same degree of heating.

Subsequent to the heating process, a gas or aerosol cooling jet may be focused on the laser heated portion of the glass. The cooling jet material composition may be chosen to maximize the cooling rate without contaminating the surface. In some examples, the cooling jet may be composed of a gas, vapor, or combination of the two. For example, pure gases such as nitrogen or hydrogen may be used, with or without vapors such as $H_2O$ or various alcohols. Using an aerosol cooling jet may reduce the size of the liquid droplets, which can reduce the flow rate of the coolant and improve the heat exchange efficiency of the cooling process.

While it is believed that the vapor may increase the heat capacity and cooling capacity of the jet, vapors may also introduce other complications to the heating and cooling process. The cooling jet material composition may include but is not bound to any requirement to include a vapor. For instance, water may not be desirable if the surface adjacent to the cut is moisture sensitive or adsorbs water vapor.

The cooling jet may be set up to trail the laser beam by a fixed amount of time. In some examples, the cooling jet may be set up to lag behind the laser between about 250 milliseconds and about 500 milliseconds. The distance between the laser and cooling jet may be a fixed distance that is determined based on the motion rate of the laser/cooling jet, and the amount of time that is it desired and/or allowable for the glass to be kept in a heated state. The fixed distance may be between about 50 millimeters and about 100 millimeters. There is an optimum range of separations between the tail of the elongated beam and the cooling jet which is believed to result in a uniform crack generation.

The general idea is to maximize the stress generated in the glass, caused by the temperature difference between the area under the trailing portion of the moving laser beam, and the area chilled by the following gas or aerosol jet. The position of the cooling jet should maximize the temperature gradient.

Again, in those examples in which the crack follows a curved path (e.g., a two dimensional curve, a three dimensional curve), the cooling jet, like the laser beam, must be capable of moving such that it may follow the same curved path as the laser beam. In some examples, the cooling just must also be able to move along that path at the desired separation.

The accompanying figures illustrate a few embodiments of a master panel in accordance with the above described laser cutting process. Those having ordinary skill in the art may be able to apply, alter, or otherwise modify what is described herein without departing from its spirit and scope. Therefore, what is illustrated is set forth only for the purposes of example and should not be taken as a limitation in the scope of the present disclosure.

Conventionally, the laser cutting, which begins at the starter crack, begins between about 10 mm to about 50 mm from the edge of the master panel. A distance of about 20 mm is typical. The area in which the starter crack is introduced is considered a "waste" area, since that area cannot be used for production of EC panels.

Figure 1:
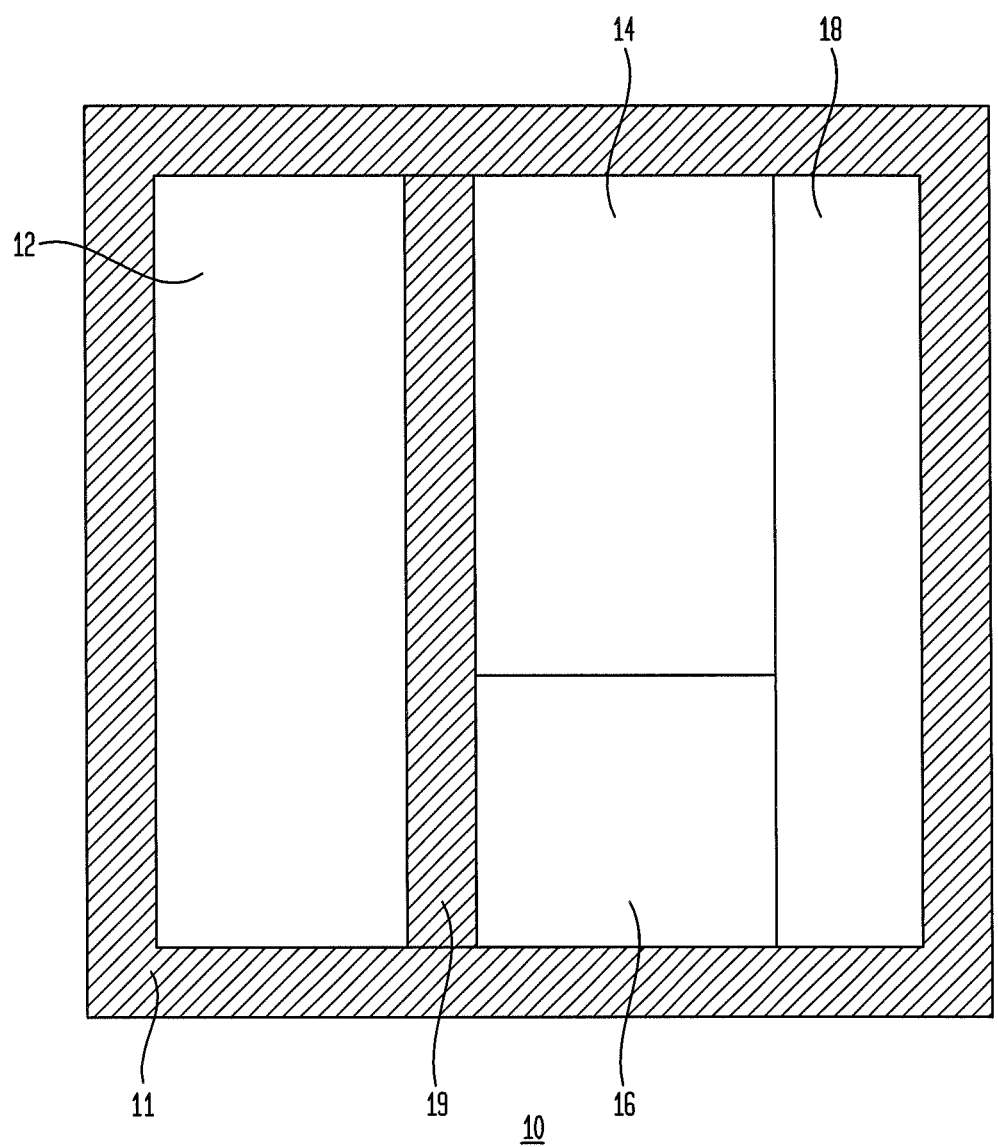
FIG. 1 is a conventional arrangement for laser scribing of EC panels out of a master panel.
Figure 2:
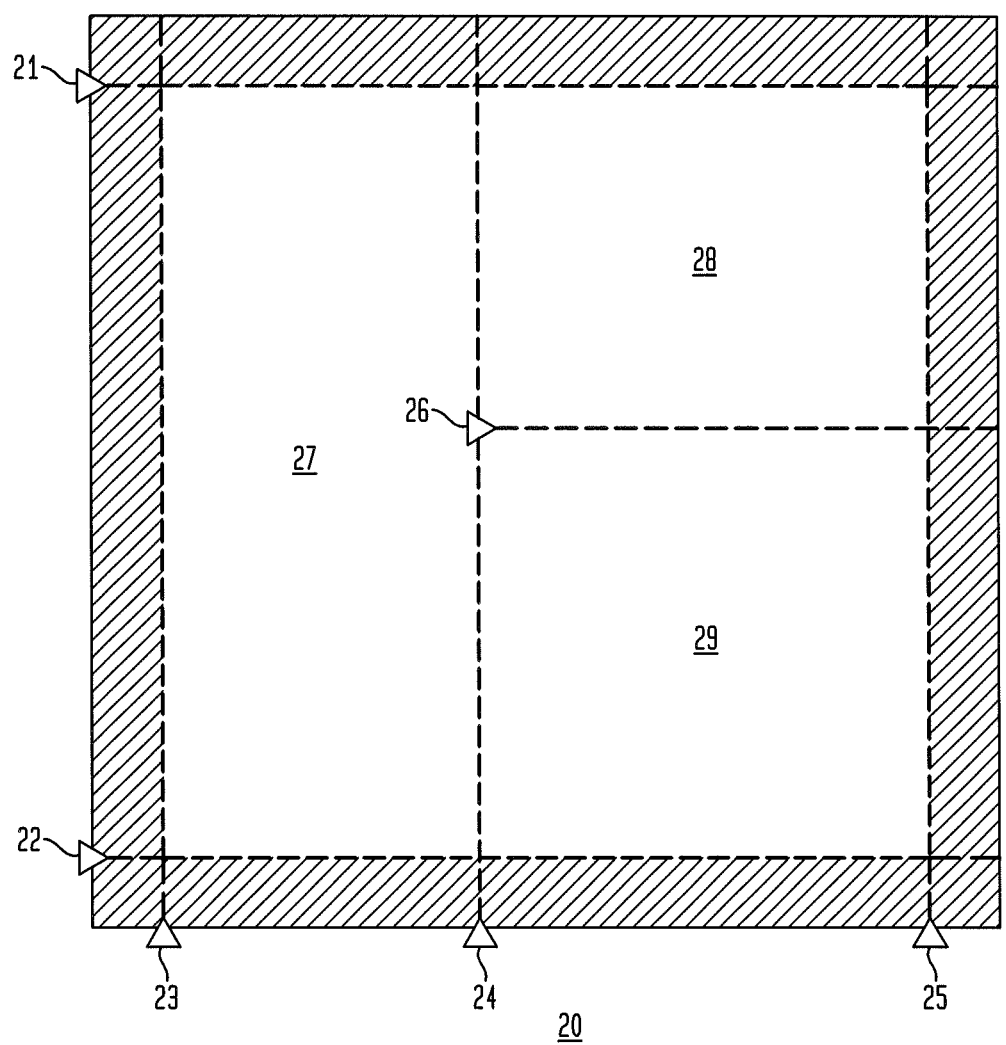
FIG. 2 is an arrangement for laser scribing of EC panels out of a master panel in accordance with an aspect of the disclosure.

FIG. 2 depicts an example of a master panel 20 that is projected to be cut into three smaller panels. Each of the three smaller panels may be used as an EC panel. A finished device can include the EC panel and a solid-state, inorganic EC device overlying the EC panel. Markers 21-26, which are only included in FIG. 2 for illustrative purposes and do not necessarily appear on the panel, indicate the points which each of the starter cracks will be made in order to cut out panels 27-29. Laser cutting of the panels will be conducted over the dotted lines. Each starter crack is the starting point for the laser cuts for the dotted line adjacent to that respective starter crack.

Figure 3A:
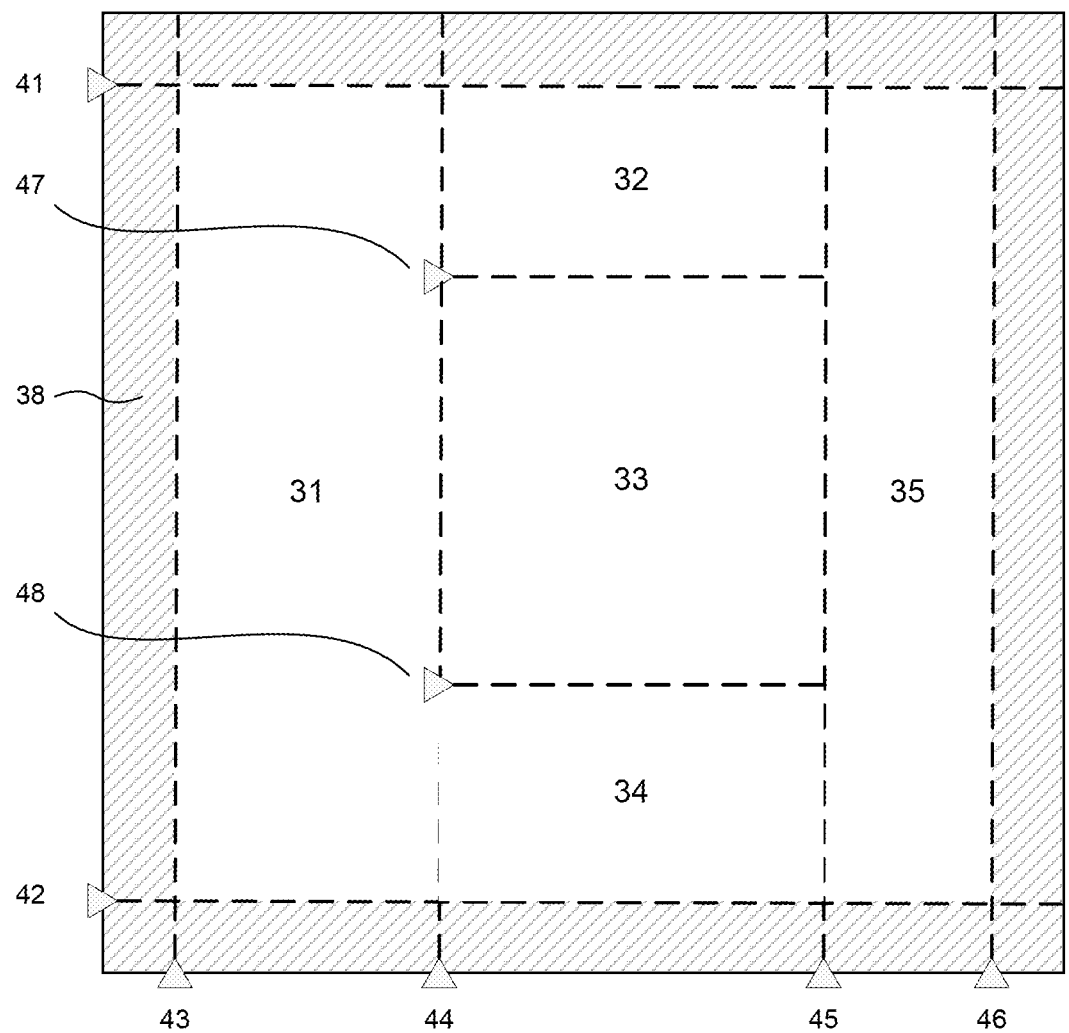
FIGS. 3A and 3B are additional arrangements for laser scribing of EC panels out of a master panel, each in accordance with an aspect of the disclosure.
Figure 3B:
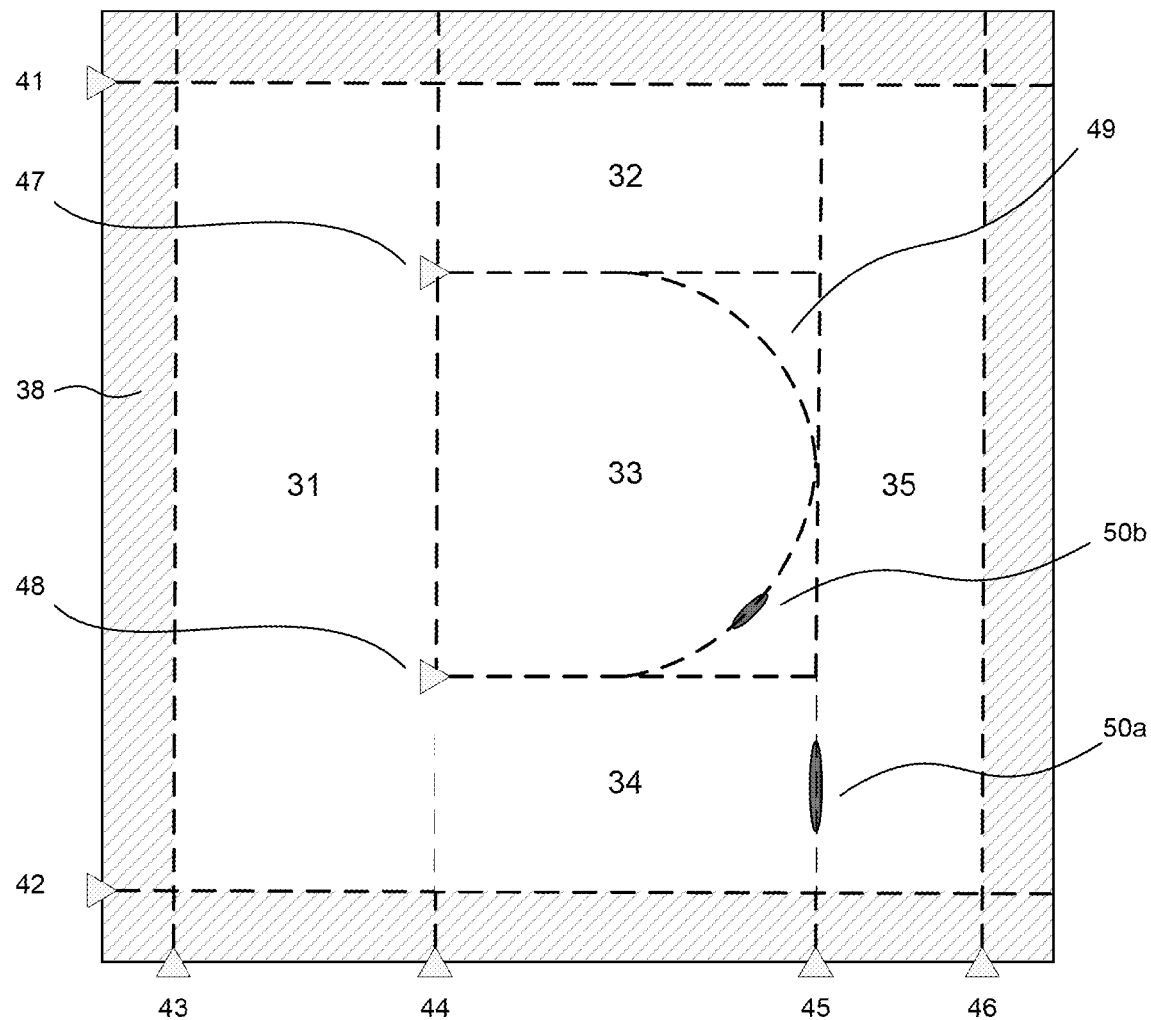

In some examples of the disclosure, the master panel may be further divided into a number of smaller custom-sized daughter panels. For example, each of FIGS. 3A and 3B depicts a master panel 30 projected to be cut into five sections 31-35. In addition to edge starter cracks, at locations 41-46, T-Cut starter cracks 47-48 (named after the T-shaped intersection between the glass panels where the starter crack is formed) are also needed to divide panels 32-34 from one another.

Specifically, a T-cut is a separation line (two dimensional or three dimensional) between two areas that starts and/or stops against a third area. In some embodiments, the T-cut may be intended to separate the first two areas from each other not propagate into and weaken the edge of the third area, such that one feature of the T-cut is its termination. A crack may form a T-cut on one or both of its ends, depending on the payout of the panels. A mechanical shutter may be used to protect the edge against which the T-cut ends from the heating from T-cut beam path. Careful gating off and on of the laser while the T-cut is being propagated may also be used to protect the intersecting edge.

In the examples of FIGS. 3A and 3B, the edge starter cracks are positioned in a shaded waste area 38. However, the T-cut starter cracks are positioned in the EC panel area itself and not in a waste area. Placing the T-cut starter crack in the EC panel is particularly beneficial for reducing the amount of waste produced when cutting EC panels, especially when cutting custom sized daughter panels from a master panel. An added benefit for inclusion of the starter crack in the daughter would be decreased laser ablated film areas required due the reduced number for laser cut scribes required.

The T-cut starter crack may be formed in any location of the EC panel provided that the starter crack is within about 10 mm to about 20 mm of the corner of the panel. Preferably the starter crack should be within about 15 mm of the corner. This constraint holds true for any size of master panel from which the smaller (e.g., custom sized) EC panel is cut.

Experimental tests have shown that edge stresses induced at the corners of an EC panel are small enough at such range from the corner to not pose a risk of cracking or failure under stress. For example, 2.2 mm thick float glass panels each about 300×about 300 mm, and each having at least one starter crack on an edge near a panel corner, were tested for thermal stress interaction using a 250×250 mm silicone heating pad (placed at the center of each glass panel) to induce edge stresses via a thermal gradient. The glass panels were heated until the panel cracked due to thermal stresses, but none of the fractures observed began at the respective starter crack areas.

Figure 4:
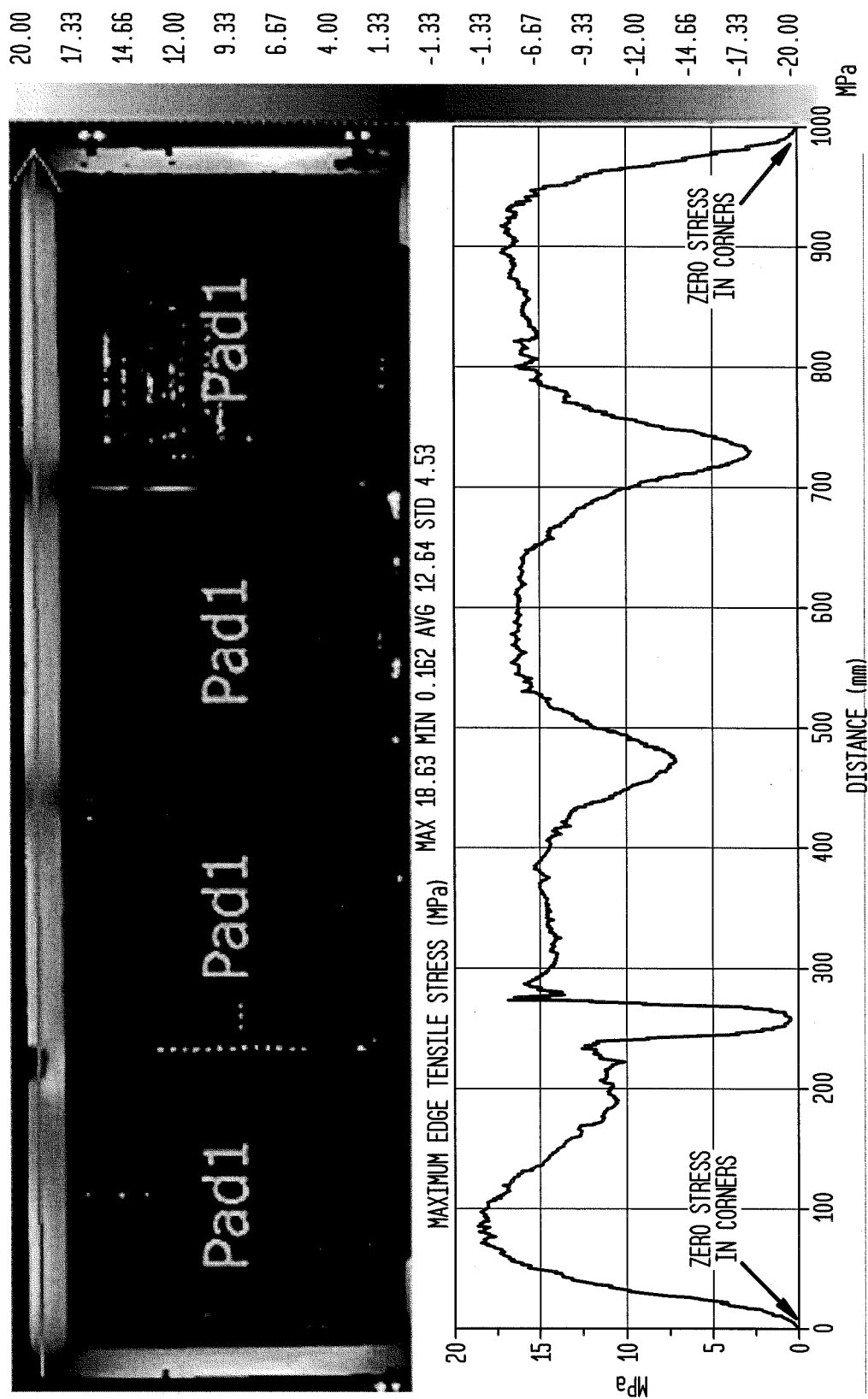
FIG. 4 is photoelastic image experimental data of an EC panel in accordance with an aspect of the disclosure.

Photoelastic images of other glass panels, about 1 square meter in size, heated by a series of silicone heating pads, each approximately 25 mm in size, further confirm the measured stress levels in the glass panels when subjected to thermal gradients. A photoelastic image is shown in FIG. 4. The image shows stresses developing from thermal gradients due to multiple silicone heating pads on a glass plate spanning approximately 1 m long edge. The heating pads create a thermal gradient with respect to the edges that causes thermal tensile stresses (in this case up to about 28 MPa). The gaps between heating pads (lower $\Delta T$) show up as a decrease in stress levels in these regions. As depicted in FIG. 4, the thermal stresses are essentially zero near the corners.

Figure 5:
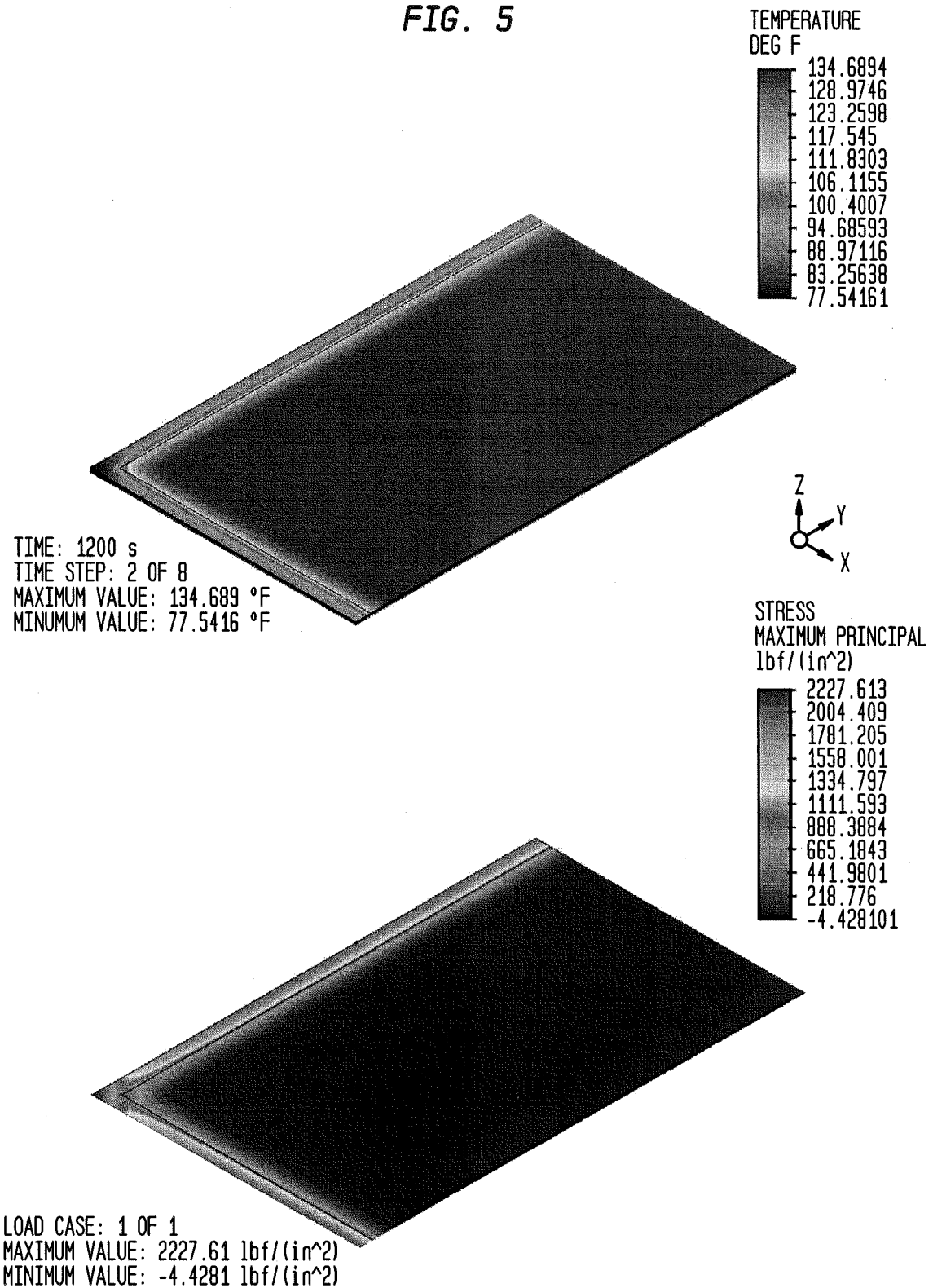
FIG. 5 is a finite element (FE) simulation model of an EC panel in accordance with an aspect of the disclosure.

Moreover, the experimental results have been corroborated in finite element modeling of panels subjected to thermal gradients. A finite element (FE) simulation model is shown in FIG. 5. The model data (quarter panel shown) shows temperature gradient and resultant maximum principal stress generation due to selected heating of a glass panel. In the example of FIG. 5, the stress generation is principally due to solar heating of the glass center while the edges are shadowed by a frame). As depicted in FIG. 5, the edge stresses in the corner are near zero, and the edge stresses build up to a steady state level.

Aside from stress introduced by thermal gradients, experimental tests have also shown that the glass panel corners having starter cracks within the above identified ranges have also been shown to experience very little risk of damage due to wind or static loading of the EC panel. For example, measured tensile stresses in the corner of an EC panel where the starter cracks are located suggest that the edge stress levels near the corners are low even for high uniform loads. FIG. 6 shows FE data of an EC panel that is attached to another panel via a metal or plastic spacer and affixed using a compliant adhesive, such as polyisobutylene and silicone, polyurethane, butyl or polysulfide. The FE data shows stress distribution associated with loading up to 5.4 kPa. The center of the panel is subjected to maximum tensile stresses of ~16 MPa (2300 psi), but the stresses near the corner are shown to be much lower (less than 2 MPa or 300 psi).

Figure 7:
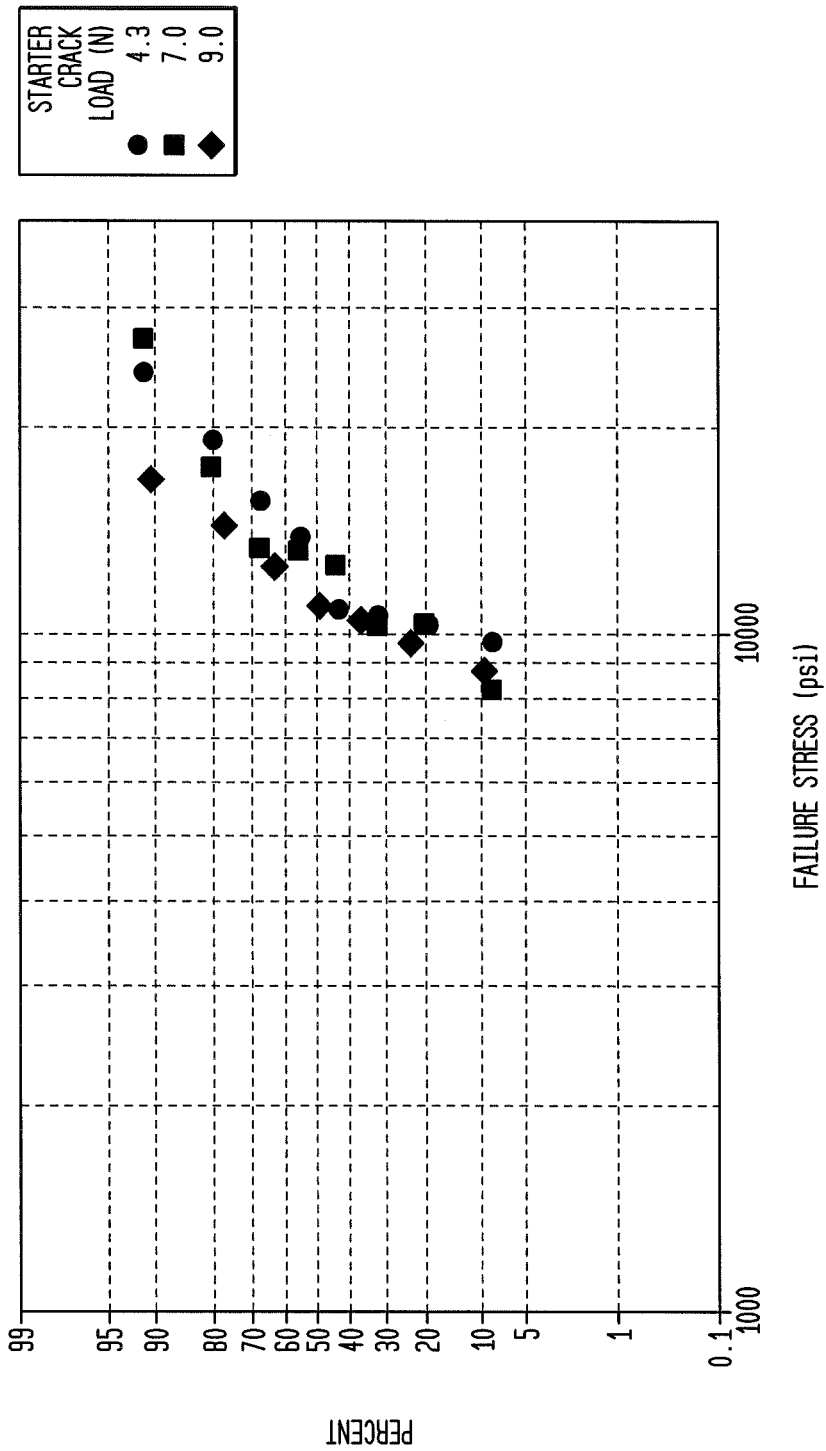
FIG. 7 is bend test experimental data of an EC panel in accordance with an aspect of the disclosure.

For further assurance, bend test data has also shown that the strength associated with the starter crack for the TLS laser cutting process. FIG. 7 bend test data for a 2.2 mm thick glass having a starter crack under a variety of loads. FIG. 7 shows that the median strength of the glass is about 10000 psi (about 69 MPa).

Taken as a whole, the above simulated and experimental results provide assurance that the presence of the starter crack within between about 10 mm and about 20 mm of the corner of an EC panel does not pose a risk of failure of the EC panel. Furthermore, the present work has wider ramifications for applications that involve a potential corner defect associated with the fabrication of a panel made from a brittle material and subjected to in-service edge stresses, outside of the specific application of electrochromic glazing.

This disclosure also applies to any other type of application where laser edge cut glass is used for its edge strength quality and present an area of the edge where the stress is lower than in other regions in the application (e.g. other type of active glazings and absorbing glasses).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method, comprising:
   forming a solid-state electrochromic device over a substrate;
   creating a starter crack on the substrate;
   one of a laser heating and electrothermal heating the starter crack; and
   cooling the heated starter crack to form the panel, wherein the panel has an edge with:
   the starter crack; and a laser cut border or an electrothermally cut border, wherein the laser cut border or the electrothermally cut border extends from the starter crack, wherein a finished panel includes the solid-state electrochromic device and the starter crack, and the starter crack does not increase the risk of cracking or fracturing in the panel due to thermal stress after formation of the panel.

2. The method of claim 1, wherein the starter crack is created within about 20 mm of a corner of the panel.

3. The method of claim 1, wherein the starter crack is between about 5 mm and 6 mm long.

4. The method of claim 1, wherein the starter crack is between about 300 microns and about 1200 microns deep.

5. The method of claim 1, wherein the starter crack is created using a scribe wheel.

6. The method of claim 1, wherein heating the starter crack further comprises:
providing a continuous wave or quasi-continuous wave laser that emits a light that is capable of being substantially absorbed by the substrate and is capable of causing thermal stress cracking to the substrate without causing softening of the substrate; and
focusing said light on the starter crack.

7. The method of claim 1, further comprising heating a portion of the substrate along a line beginning at the starter crack.

8. The method of claim 7, further comprising cooling the heated portion of the substrate, wherein the cooling of a segment of the portion of the substrate begins between about 250 milliseconds and about 500 milliseconds after said segment is heated.

9. The method of claim 7, wherein the focused area of the laser or electrothermal cutter is elongated in the direction of the lines such that a laser beam emitted by the laser focuses on any segment of the line for a relatively greater period of time than if the focused area of the laser were not elongated.

10. The method of claim 7, wherein the heating is performed along a curved line.

11. A glass panel produced using the method of claim 1, the glass panel being cut from a larger substrate, and comprising at least one laser cut border and a starter crack within about 20 mm of a corner adjacent to the at least one laser cut border.

12. The glass panel of claim 11, wherein said border is a thermally stress cracked border, the thermal stress crack beginning at the starter crack and extending along the border.

13. The glass panel of claim 12, wherein the thermally stress cracked border is curved.

14. The glass panel of claim 11, wherein said corner experiences essentially zero thermal stress when a heating pad placed on the panel causes thermal tensile stresses of up to about 28 MPa to another portions of the panel.

15. The glass panel of claim 11, wherein said corner experiences less than about 300 psi when the center of the panel is subjected to tensile stress of about 2300 psi.

16. The glass panel of claim 11, wherein the starter crack is formed at a T-shaped intersection between where glass panels will be separated from the substrate.

17. The method of claim 1, wherein creating the starter crack is performed using a tool at a force of 10 Newtons of less.

18. The method of claim 1, wherein the panel is at least part of an electrochromic panel.

19. An electrochromic panel comprising:
a glass panel having an edge with:
a starter crack; and
a laser cut border or an electrothermally cut border, wherein the laser cut border or the electrothermally cut border extends from the starter crack;
and a solid-state electrochromic device overlying the glass panel,
wherein the electrochromic panel includes the solid-state electrochromic device and the starter crack.

20. A method comprising:
providing an electrochromic panel comprising:
a glass panel having an edge with:
a starter crack; and
a laser cut border or an electrothermally cut border, wherein the laser cut border or the electrothermally cut border extends from the starter crack; and
a solid-state electrochromic device overlying the glass panel,
wherein the electrochromic panel includes the solid-state electrochromic device and the starter crack; and
exposing the electrochromic panel to a thermal stress, wherein the starter does not increase the risk of cracking or fracturing in the electrochromic panel due to exposure to the thermal stress.

* * * * *